United States Patent Office 2,995,957
Patented Aug. 15, 1961

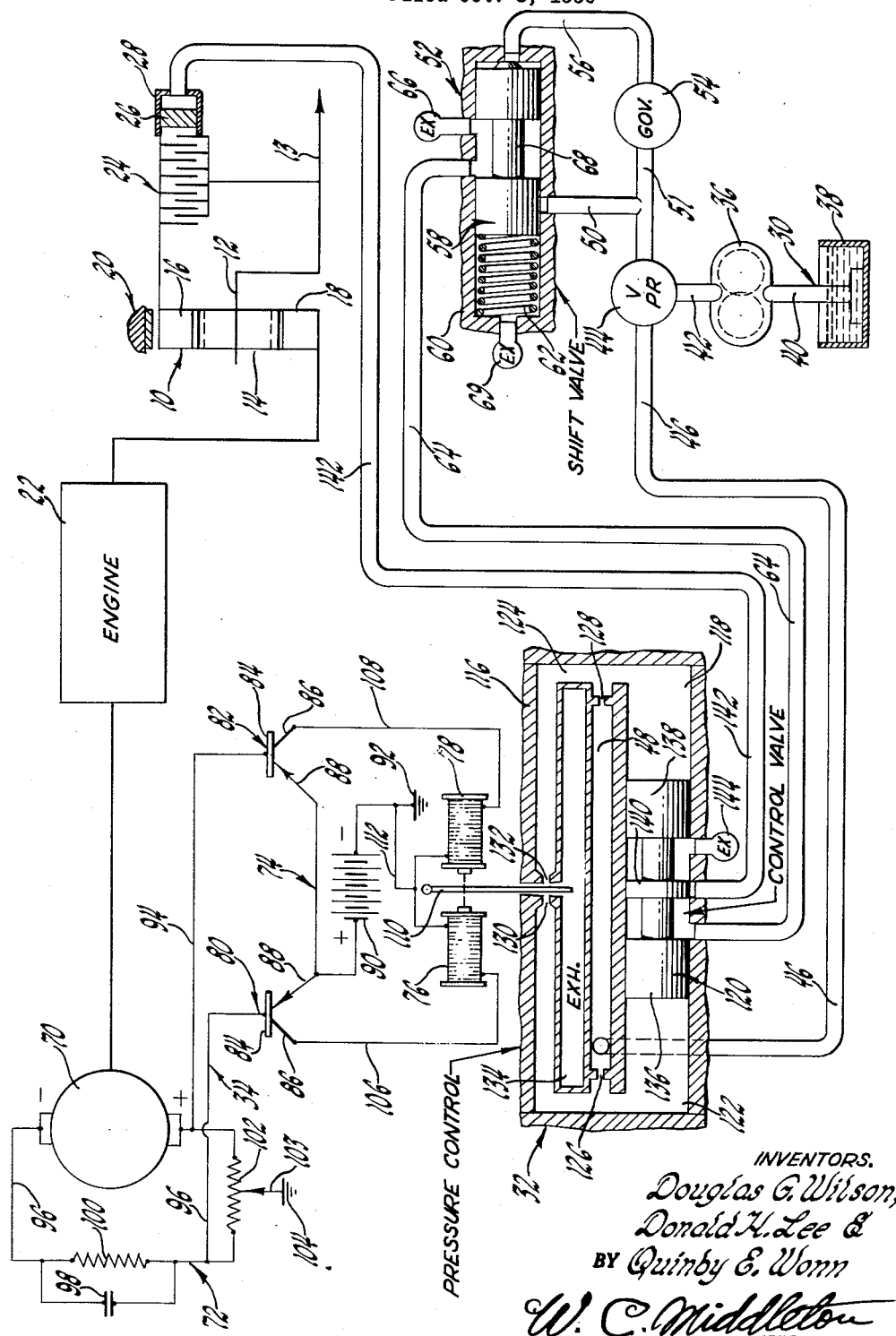

2,995,957
TRANSMISSION CONTROL DEVICE
Douglas G. Wilson, Detroit, Donald H. Lee, Ypsilanti, and Quinby E. Wonn, Plymouth, Mich., assignors to General Motors Corporation, Detroit, Mich., a corporation of Delaware
Filed Oct. 8, 1956, Ser. No. 614,678
17 Claims. (Cl. 74—752)

This invention relates to motor vehicle transmissions and particularly to control devices for varying engagement rates of a torque transmitter.

In motor vehicle transmissions to obtain smooth shifts from one speed ratio to another, either up or down, it is desirable that engine speeds change at a predetermined rate, i.e., at a rate that is not noticeable to an operator either as excessive noise or jerkiness and that does not interfere with efficiency of operation as with excessive slippage. This can be further explained with reference to a specific example as when the transmission is upshifting from a low speed ratio to a higher speed ratio upon the disengagement of one torque transmitting unit and engagement of another. If the latter torque transmitting unit is engaged too promptly then the engine speed will decrease abruptly resulting in a harsh upshift. At the opposite extreme with the engagement being too slow, engine speed will not decrease properly and may even increase. Consequently, the operator senses a slipping shift or if the engine speed increases, a run-away shift either of which wastes power.

The problem of acquiring smooth shifts is further complicated as between different transmissions because of the non-uniformity of engaging characteristics among otherwise identical torque transmitters. These characteristics differ due to variations in the parts of each torque transmitter from manufacturing tolerances. Also, wear is a factor, since frequently torque transmitters slip with continued usage.

With these considerations in mind, it is the primary object of this invention to provide a device for controlling the rate of engagement of a torque transmitter to provide a smooth engagement.

Further, the invention contemplates a control device for varying the rate of engagement of a torque transmitter according to a predetermined optimum rate.

Another object is to correlate the rate of engagement of a torque transmitter with the rate of deceleration of a driving means.

Another object is to provide a control device which detects any deviations in the rate of change in the speed of a driving means from a preset standard rate and accordingly increases or decreases the rate of engagement of a torque transmitter.

A more specific object is to provide a means which is adjusted for a rate that has fixed linear relation between changes in speed of a driving means and time and which means function to control the rate of engagement of a torque transmitter in accordance with this fixed rate.

In carrying out the invention an electronic means is utilized which by means of a tachometer generator develops a signal voltage that varies with engine speed. This signal voltage then proceeds to a rate circuit which is calibrated according to some predetermined rate of change in engine speed so that, if engine speed changes at this rate, no signal voltage will be passed on to an amplifier. However, if engine speed changes faster or slower than this rate, a signal voltage will be received by the amplifier. The amplifier then influences an associated pressure regulating mechanism to increase or decrease pressure supplied for engaging a torque transmitter. As an example, with engine speed decreasing faster than this predetermined rate, the rate of engagement of the torque transmitter will be decreased by the combined operation of the electronic means and the pressure regulating mechanism.

The foregoing and other objects and advantages of the invention will be apparent from the following description and from the accompanying drawing in which an embodiment of the invention is shown diagrammatically.

As demonstrated, the invention is incorporated in a transmission consisting of a reduction planetary gear set 10 having an output planet carrier 12 connected to an output shaft 13. The carrier 12 rotatably supports a plurality of planet pinions 14 in meshing relation with a reaction ring gear 16 and an input sun gear 18. A suitable brake or band 20 holds the ring gear 16 against rotation to provide a reduced drive from an engine 22 through the gear set and a torque transmitter, e.g., multiplate clutch 24, clutches together when engaged, the ring gear 16 and the carrier 12 for a direct drive. To engage the clutch 24, a piston 26 axially slidable in servo cylinder 28 is subjected to a fluid apply pressure in a known manner.

When the clutch 24 is engaged, the speed of the engine 22 will start to decrease either slowly or rapidly depending on the rate of engagement of the clutch. If the engagement rate is too fast, the engine speed will decrease too quickly while with a too slow rate, the shift will be delayed and the engine speed will not decrease properly and may even increase. Both of these conditions tend to give a very jerky shift. For the smoothest possible shift, it has been determined that the optimum engagement rate is one in which the engine speed decreases linearly with respect to time.

To provide this optimum clutch engagement, a control system is utilized comprising a pressure fluid supply 30, a pressure control mechanism 32 for regulating the fluid clutch apply pressure from the supply 30, and an electronic means, designated generally at 34, for detecting variations in the rate of change of engine speeds from a desired rate and accordingly controlling the pressures developed by the mechanism 32.

The pressure supply 30 for the control system includes an appropriate pump 36 driven by the engine or by the output shaft 13 to pump fluid from a sump 38 through a suction conduit 40 to discharge conduit 42 connected to a pressure-regulator valve 44 of known construction. From this pressure-regulator valve 44 fluid at a pressure determined by this regulator valve is transferred by a regulating supply conduit 46 to an inlet chamber 48 of the pressure control mechanism 32 and by a branch 50 of a shift valve supply conduit 51 to a shift valve 52. The supply conduit 51 also supplies pressure fluid to a conventional hydraulic governor 54, e.g., the type disclosed by the patent to Thompson, 2,204,872, which is preferably driven at the speed of the output shaft 13 to develop a vehicle speed conscious pressure for transfer through a governor feed conduit 56 to the shift valve 52.

The shift valve 52 includes a spool member 58 slidable in a valve body 60 and biased by a spring 62 to the position shown. A clutch supply conduit 64 connected to the pressure mechanism 32 and an exhaust passage 66 connected to the sump are axially spaced a distance that permits communication therebetween by a relieved portion 68 of the spool member 58 in the depicted position. At a given speed, the governor will supply sufficient pressure fluid through the feed conduit 56 which pressure fluid will act on the end opposite the spring 62 to move the valve in opposition to the spring bias to a position which permits communication between the branch 50, shift valve supply conduit 51, and the clutch supply conduit 64. At the spring end of the valve body 60, an exhaust passage 69 is afforded to drain leakage fluid.

For the pressure mechanism 32 to regulate clutch apply pressure, the electronic means 34 is utilized to develop a control current which is proportional to the rate of change of the desired engine speed. This electronic means 34 comprises a voltage generating means, such as engine driven tachometer generator 70, an electronic time-constant circuit 72 for establishing the desired rate, an amplifier 74, and relays 76 and 78 which relays are energized in an opposite sense.

The amplifier 74 comprises a pair of amplifying devices which are, preferably, a pair of push-pull transistors 80 and 82, suitably of the P-N-P junction type, having control, collector, and emitter electrodes 84, 86 and 88, respectively. Although transistors are preferred, vacuum tubes or equivalents may be used. A supply voltage is applied between the emitter and collector electrodes of both of these transistors 80 and 82 by an appropriate source, as vehicle battery 90 grounded at 92. The input circuit for the amplifier extends between the control electrodes 84 and includes conductors 94 and 96 and the tachometer generator 70.

Between the generator 70 and the amplifier 74 the time constant circuit 72 of a differentiating type is arranged comprising a condenser 98 in the conductor 96 and the base emitter resistance of both transistors 80 and 82. A shunt resistor 100 is added to the time constant circuit in parallel with the condenser 98 to apply a voltage to the input circuit of the transistors, which is proportional to engine speed.

To vary the control electrode bias of the transistors 80 and 82, bias circuits are employed with one extending from one end of a variable resistance 102 through the conductor 96 and the control and emitter electrodes 84 and 88 of transistor 80 to the positive terminal of the battery 90. The other of these bias circuits extends from the opposite end of the variable resistance 102 through the conductor 94 and the control and emitter electrodes 84 and 88 of the transistor 82 also to the positive terminal of the battery. An adjustable tap 103 grounded at 104 is movable along the resistor 102 in a well-known manner to change the relative control electrode bias of the two transistors. By varying this bias, one output current from one transistor can be maintained greater than the other.

The output circuit for the transistors 80 and 82 has conductors 106 and 108, respectively, interconnecting the relays 76 and 78 to the collector electrodes 86. These relays manipulate a pivotably mounted reed or flapper valve 110 associated with the pressure mechanism 32. A conductor 112 from the relays 76 and 78 is grounded with the battery 90 at 92.

This electronic means 34 develops by means of the tachometer generator 70 a direct current voltage which is proportional to the speed of engine for application to the differentiating and amplifying circuits. Considering this time constant or differentiating circuit 72, there will be a zero signal voltage passed onto the amplifier 74 from the generator 70 when the engine speed is constant. Also, when the engine speed changes at the desired rate, there will be essentially a zero signal voltage passed on since the voltage change will be negligible at this rate. However, if the rate of change of the engine speed is different from this desired rate of change, the time constant circuit will develop a signal voltage which, when amplified by the transistors 80 and 82, will cause a change in the relation of the transistor output currents from the relationship established by the variable resistance 102. This change of the output currents influences the position of the reed valve 110 by varying the energization of the relays 76 and 78.

It should be noted that since the shunt resistor 100 applies a voltage proportional to engine speed to the input circuit of the transistors, the amplifier 74 receives a composite signal of speed and rate of change of speed. The effect of the speed voltage alone is arranged to unbalance the output currents of the transistors in a direction tending to retard clutch engagement.

Pressure mechanism 32 comprises a chambered body 116 including a bore 118 in which a control valve 120 is axially slidable. Side chambers 122 and 124 each communicate with the opposite ends of the bore 118 and the aforementioned inlet chamber 48. Pressure fluid from the regulating supply conduit 46 is furnished to the side chambers 122 and 124 from the inlet chamber 48 through orifices or restrictions 126 and 128, respectively, which orifices are utilized in creating a pressure differential to render the mechanism operative. At the top of the body 116 the side chamber 122 terminates in an orificed passage 130 and the side chamber 124 ends in an orificed passage 132. The body 116 is recessed to receive the pivotally movable reed valve 110 so that the valve can be moved left or right to close off selectively the orificed passages 130 and 132 from an exhaust chamber 134.

The control valve 120 has two end lands 136 and 138 with an intermediate narrower land 140 connected to each end land by relieved portions. In the depicted position the intermediate land 140 covers a clutch apply conduit 142 while the end land 136 maintains the adjacent clutch supply conduit 64 open and the end land 138 keeps an exhaust passage 144 open. During operation, as mentioned before, the control electrode bias is adjusted to provide a greater output current in the conductor 106 to the relay 76 than in conductor 108. Consequently, the reed valve 110 will be attracted to the left in sealing relation with the orifice passage 130. Pressure in the side chamber 122 will continuously urge the control valve 120 slightly to the right permitting fluid communication between the clutch supply conduit 64 and the clutch apply conduit 142. Pressure fluid then will act on the piston 26 tending to initiate clutch engagement. With the control valve 120 moved in the opposite direction, as when the reed valve covers the orifice passage 132, the exhaust passage 144 and the clutch apply conduit 142 will be in communication, hence relieving the clutch apply pressure and tending to disengage the clutch.

In operation, if the shift valve 52 has been moved by the governor 54 to the position opposite that shown, pressure fluid will pass from the branch 50 of conduit 51 through valve 52 and the clutch supply conduit 64 to the pressure mechanism 32. With the control valve 120 constantly urged to the clutch engaged position, as described above, pressure fluid will proceed from the conduit 64 between the lands 136 and 140 of the valve 120 through the clutch apply conduit 142 to start clutch engagement. If this engagement is too rapid, the engine speed will start to decrease quicker than desired. Then the tachometer generator signal voltage will drop and the signal developed by the rate circuit 72 will cause the output current of the transistor 82 to become greater than the output current of the transistor 80 so that the relay 78 will move the reed valve 110 to the right closing orifice passage 132. The resultant build up of pressure in the side chamber 124 will move the valve 120 to the left so as to relieve part of the pressure fluid in the clutch supply conduit 142 to exhaust passage 144, thereby slowing up clutch engagement. On the other hand, if clutch engagement is too slow, the engine 22 will decrease in speed slower than the desired rate. Consequently, the tachometer generator 70 will produce an increased signal which the rate circuit 72 will transfer to the transistors. The output current of transistor 80 will increase and accordingly increase the pressure in the side chamber 122. As a result, the control valve 120 will be maneuvered to the left until pressure fluid in the clutch apply conduit 142 is sufficient to speed up clutch engagement and bring the engine speed down to that desired. Of course, if the engine speed deviations are only slight, they will not have any effect on the system. The cycle of operations just described occur continuously during operation so that the control valve 120 is constantly reciprocating to regulate clutch apply pressure.

From the foregoing it is apparent that unless the rate of change in engine speeds is in accordance with a preset or desired rate of clutch engagement, clutch apply pressures will instantly be varied by the control device until rate changes in the engine speed correspond as nearly as possible with this desired rate. As a result, wear will not affect the rate of engagement nor will manufacturing tolerances. The rate of engagement will only be that predetermined by the control device.

We claim:

1. In a transmission, the combination comprising, engageable torque transmitting means for transferring drive between driving and driven members, means for engaging and disengaging the torque transmitting means, means establishing a predetermined rate of change in speed standard for the driving member, and means responsive to variations in the rate of change in speed of the driving member for varying the rate of engagement of said torque transmitting means, said rate varying means being adapted to control the rate of engagement according to variations in the rate of change in speed of the driving member both above and below the predetermined rate standard during engagement of said torque transmitting means.

2. In a transmission, the combination comprising, torque transmitting means engageable for transferring drive between driving and driven members, means establishing a predetermined rate of change in speed standard for one of the members, and pressure means for varying the rate of engagement of said torque transmitting means with variations in the rate of change in the speed of said one of the members both above and below the predetermined rate standard during an engagement of said torque transmitting means.

3. In a transmission, the combination comprising, torque-transmitting means engageable for transferring drive between driving and driven members, pressure means for varying the rate of engagement of said torque-transmitting means, means establishing a predetermined rate of change in speed standard for the driving member, and means for controlling said pressure means in accordance with variations in the rate of change in speed of the driving member both above and below the predetermined rate standard during an engagement of said torque transmitting means.

4. In a transmission, the combination comprising, torque-transmitting means engageable for transferring drive between driving and driven members, pressure means for varying the rate of engagement of said torque-transmitting means, means establishing a predetermined rate of change in speed standard for the driving member, and electrical means for controlling said pressure means in accordance with variations in the rate of change of speed in the driving member both above and below the predetermined rate standard during an engagement of said torque transmitting means.

5. In a control device, the combination comprising, means for developing a changing signal voltage, means establishing a predetermined rate of change in voltage standard, means for continuously amplifying the signal voltage and detecting rate changes in the signal voltage both above and below the predetermined rate standard when the signal voltage is changing in a predetermined direction and a pressure device controlled by the amplified voltage to vary output of said pressure device in accordance with rate changes in the signal voltage from the predetermined rate standard.

6. In a transmission driven by a prime mover, the combination comprising an input drive connected to the prime mover, an output, a step ratio torque transmitting mechanism disposed between said input and said output, a fluid pressure operated friction engaging device for establishing a ratio of torque transmission by said mechanism, valve means for varying the supply of pressure fluid to said friction engaging device, and control means both for establishing a predetermined rate of change standard for said prime mover and for sensing any deviations in the rate of change of speed of said prime mover both above and below said standard during an engagement of said friction engaging device, said control means controlling said valve means for altering the rate of engagement of said friction engaging device to maintain the speed change rate of the prime mover in accordance with said standard.

7. In a transmission driven by a prime mover, the combination comprising; an input drive connected to the prime mover; an output; a step ratio torque transmitting mechanism disposed between said input and said output; a fluid pressure operated friction engaging device for establishing a ratio of torque transmission by said mechanism; valve means for varying the supply of pressure fluid to said friction engaging device; and electronic control means including a generator for developing a signal voltage proportional to prime mover speed, means establishing a predetermined rate of speed standard, and a circuit between said valve means and said generator sensitive when the signal voltage is changing in a predetermined direction to increasing and decreasing deviations in the signal voltage with changes in the rate of change of the prime mover speed from the predetermined rate of change standard; said circuit being adapted to control said valve means and vary engagement rates of said friction engaging device so as to maintain the rate of change in prime mover speed during engagement in accordance with the predetermined rate of change standard.

8. In a control device, the combination comprising, means for developing a changing signal voltage, means for continuously amplifying the signal voltage, said amplifying means including an input circuit having a time constant circuit portion connected to said signal voltage developing means for establishing a predetermined rate change standard for the signal voltage, an output circuit, and a pressure device associated with said output circuit and controlled by the amplified voltage to vary output of said pressure device in accordance with variations in rate changes in the signal voltage above and below the rate standard established by said time constant circuit when the signal voltage is changing in a predetermined direction.

9. In a control device, the combination comprising, means for developing a changing signal voltage, a continuously variable amplifying device having emitter, collector and control electrodes for amplifying the signal voltage, an input circuit extending between said control electrode and said signal voltage developing means and including a time constant circuit for establishing a predetermined rate change standard for the signal voltage, an output circuit having a source of electrical current and extending from said source through said collector and emitter electrodes, and a pressure mechanism associated with said output circuit for varying pressures in accordance with variations in the rate changes in the signal voltage above and below the predetermined rate change standard when the signal voltage is changing in a predetermined direction.

10. In a control device, the combination comprising, a tachometer generator for developing a direct current signal voltage, a pair of amplifying devices having emitter, collector and control electrodes for amplifying the signal voltage, an adjustable resistance for varying the relative bias of said control electrodes, an input circuit extending between said control electrodes from said tachometer generator and including a time constant circuit for establishing a desired rate change in the signal voltage, an output circuit including a source of voltage and extending through said collector, and emitter electrodes between a pair of relay windings, and a pressure mechanism operated by said relay windings to vary pressure in accordance with variations in rate changes of the signal voltage developed by said tachometer generator from the desired rate of change.

11. In a control device for a clutch having driving and driven members, the combination comprising, pressure responsive means for engaging the clutch, pressure regulating means for varying clutch engaging pressures, means establishing a predetermined rate of change in speed standard for the clutch driving member, and electrical means responsive to changes in the speed of the clutch driving member above and below the predetermined rate standard during an engagement of said clutch for controlling said pressure regulating means to vary clutch engagement rates so that the changes in the speed of the clutch driving member will be according to the predetermined rate.

12. In a transmission, the combination comprising engageable torque transmitting means for transferring drive between driving and driven members, means for engaging and disengaging the torque transmitting means, means establishing a predetermined rate of change in speed standard for one of the members, and means responsive to variations in the rate of change in speed of said one of the members both above and below the predetermined rate standard for varying the rate of engagement of said torque transmitting means so as to cause the rate of change to approximate the predetermined rate standard during an engagement of said torque transmitting means.

13. In a transmission driven by a prime mover, the combination comprising an input drive connected to the prime mover, an output, a step ratio torque transmitting mechanism disposed between said input and said output, a fluid presure operated friction engaging device for establishing a ratio of torque transmission by said mechanism, a generator for developing a signal voltage proportional to changes in speed of the prime mover, a continuously variable amplifying device having emitter, collector, and control electrodes for amplifying the signal voltage, an input circuit extending between said control electrode and said generator and including a time constant circuit for establishing a desired rate of change standard of the signal voltage, the input circuit being sensitive to increasing and decreasing deviations in signal voltage from the desired rate of change standard when the signal voltage is changing in a predetermined direction, an output circuit having a source of electrical current and extending from said source through said collector and emitter electrodes, and valve means associated with said output circuit for controlling the supply of pressure fluid to said friction engaging device to vary the rate of engagement of said friction engaging device so as to maintain the rate of change of prime mover speed in accordance with the desired rate of change standard.

14. In a control device for a clutch having driving and driven members, the combination comprising a voltage generating means revolvable at a speed proportional to the speed of said driving clutch member so as to develop a changing signal voltage, a continuously variable amplifying device having emitter, collector, and control electrodes for amplifying the signal voltage, an input circuit extending between said control electrode and said signal voltage developing means and including a time constant circuit for establishing a desired rate change in the signal voltage, the input circuit being sensitive to increasing and decreasing deviations in signal voltage from the desired rate of change standard when the signal voltage is changing in a predetermined direction, an output circuit having a source of electrical current and extending from said source through said collector and emitter electrodes, and a pressure regulating mechanism associated with said output circuit for varying clutch engaging pressure rates in accordance with rate changes in the signal voltage so as to approximate the desired rate change.

15. In a control device for a clutch having driving and driven members, the combination comprising pressure responsive means for engaging the clutch, a tachometer generator revolvable at a speed proportional to the speed of said driving clutch member so as to develop a signal voltage, a pair of amplifying devices having emitter, collector, and control electrodes for amplifying the signal voltage, an adjustable resistance for varying the relative bias of said control electrodes, an input circuit extending between said control electrodes from said tachometer generator and including a time constant circuit for establishing a desired rate change in the signal voltage, an output circuit including a source of voltage and extending through said collector and emitter electrodes to a pair of relay windings, and a pressure regulating mechanism operated by said relay windings to vary pressure in accordance with rate changes in the signal voltage developed by said tachometer generator so as to approximate the desired rate change.

16. In a control device for a clutch having driving and driven members, the combination comprising pressure responsive means for engaging the clutch, and control means including means for establishing a predetermined rate standard of change in speed of one of said driving and driven members for each engagement of the clutch, the control means coacting with said pressure responsive means so as to vary the rate of engagement of the clutch and cause the speed of said one of said driving and driven members to change at the predetermined rate standard.

17. In a control device for a clutch having driving and driven members, the combination comprising pressure responsive means for engaging the clutch, pressure regulating means for varying clutch engaging pressures, means for establishing a predetermined rate standard of change in speed of the clutch driving member for each clutch engagement, and means responsive to changes in speed of the clutch driving member from the predetermined rate for controlling said pressure regulating means to vary clutch engagement rates so that the changes in speed of the clutch driving member will be according to the predetermined rate standard.

References Cited in the file of this patent

UNITED STATES PATENTS

| | | |
|---|---|---|
| 2,039,701 | Bush | May 5, 1936 |
| 2,175,219 | Sanford | Oct. 10, 1939 |
| 2,338,546 | Scholl | Jan. 4, 1944 |
| 2,429,072 | Place | Oct. 14, 1947 |
| 2,438,394 | Hines | Mar. 23, 1948 |
| 2,544,523 | Bogdanoff | Mar. 6, 1951 |
| 2,609,905 | Thomas | Sept. 9, 1952 |
| 2,624,432 | Randol | Jan. 6, 1953 |
| 2,651,949 | Barnes | Sept. 15, 1953 |
| 2,715,455 | Miller | Aug. 16, 1955 |
| 2,762,464 | Wilcox | Sept. 11, 1956 |
| 2,765,893 | Stuart | Oct. 9, 1956 |
| 2,768,331 | Centrone | Oct. 23, 1956 |
| 2,775,910 | Wilkerson | Jan. 1, 1957 |